United States Patent
Epler et al.

(10) Patent No.: US 9,691,058 B2
(45) Date of Patent: Jun. 27, 2017

(54) AUTOMATED BUDGETED TRANSFER PROCESS FOR LINKED ACCOUNTS

(71) Applicant: Bank of America Corporation, Charlotte, NC (US)

(72) Inventors: Michael Raymond Epler, Simi Valley, CA (US); Michael Emil Ogrinz, Easton, CT (US)

(73) Assignee: Bank of America Corporation, Charlotte, NC (US)

( * ) Notice: Subject to any disclaimer, the term of this patent is extended or adjusted under 35 U.S.C. 154(b) by 268 days.

(21) Appl. No.: 14/220,898

(22) Filed: Mar. 20, 2014

(65) Prior Publication Data

US 2015/0269545 A1  Sep. 24, 2015

(51) Int. Cl.
*G06Q 40/00*  (2012.01)
*G06Q 20/10*  (2012.01)

(52) U.S. Cl.
CPC .......... *G06Q 20/108* (2013.01); *G06Q 20/10* (2013.01)

(58) Field of Classification Search
CPC ........ G06Q 10/00; G06Q 20/00; G06Q 30/00; G06Q 40/00
USPC ...................................... 705/3–44
See application file for complete search history.

(56) References Cited

U.S. PATENT DOCUMENTS

| | | | | |
|---|---|---|---|---|
| 7,769,659 | B2 * | 8/2010 | Arena | G06Q 40/00 705/35 |
| 7,840,480 | B2 * | 11/2010 | Kim-E | G06Q 40/00 705/35 |
| 8,548,634 | B2 * | 10/2013 | Yaoyama | G03G 15/5004 370/311 |
| 8,639,622 | B1 * | 1/2014 | Moore | G06Q 20/405 705/35 |
| 2001/0042032 | A1 * | 11/2001 | Crawshaw | G06Q 10/06 705/32 |
| 2009/0192947 | A1 * | 7/2009 | Kenigsberg | G06Q 40/06 705/36 R |
| 2012/0197783 | A1 * | 8/2012 | Hunter | G06Q 20/10 705/39 |
| 2014/0067712 | A1 * | 3/2014 | Prasad | G06Q 40/06 705/36 R |
| 2014/0136383 | A1 * | 5/2014 | Wright | G06Q 40/06 705/35 |

* cited by examiner

*Primary Examiner* — Frantzy Poinvil
(74) *Attorney, Agent, or Firm* — Michael A. Springs; Moore & Van Allen PLLC; Nicholas C. Russell

(57) ABSTRACT

Embodiments for linking accounts and transferring funds between linked accounts include system for receiving financial account data and identifying at least one funding account and one or more receiving accounts from the account data. The systems determine a mapping strategy for linking the at least one funding account and one or more receiving accounts and link the at least one funding account and the one or more receiving accounts according to the mapping strategy. The systems further set parameters and execute a transfer of funds between the linked accounts in accordance with the parameters.

14 Claims, 4 Drawing Sheets

| REPORTING | SET UP ACCOUNTS | BUDGET CATEGORY MAINTENANCE | TRANSFERS |

BUDGET CATEGORIES [3 months ▽]

LIVING - BUDGET MAXIMUM ($X,XXX.00)
MEDICAL-BUDGET MAXIMUM ($XX,XXX.00)
GAS- BUDGET MAXIMUM ($XXX.00)
* FOOD
(-) MISCELLANEOUS
- EDUCATION-BUDGET MAXIMUM ($XXX.00)
- **WORK-BUDGET MAXIMUM ($XXX.00)
- TRAVEL- BUDGET MAXIMUM ($X,XXX.00)

* Budget maximum may be set here
** Click here to modify qualifications for work related expenses

EXPENSES FOR MM/DD/YY TO MM/DD/YY

ACCOUNT XXXX ▽

UTILITY CO. $XXX.XX

PHONE CO. $XXXX.XX

STORE A $XX.XX

AUTOMATIC BILL PAY $X,XXX.XX

STORE B $XX.XX

AUTOMATED BUDGETED TRANSFER PROCESS FOR LINKED ACCOUNTS

BACKGROUND

In financial situations that involve dependents and guardians, it is important that dependents maintain their individual freedom for bill paying, yet not release large sums of funds ahead of time which might be mismanaged. The daily interaction to gather the dependent's bills that have already been paid is a time consuming task that requires coordination and interaction between the parties. This process can cause friction between family members or close friends and associates.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

The embodiments are directed to systems for transferring funds between linked financial accounts in accordance with predefined transfer and budget criteria. In some embodiments, the systems include a computer apparatus including a processor and a memory and a software module stored in the memory, comprising executable instructions that when executed by the processor cause the processor to receive financial account data. In some embodiments, the executable instructions further cause the processor to identify at least one funding account and one or more receiving accounts from the account data. In some embodiments, the executable instructions further cause the processor to determine a mapping strategy for linking the at least one funding account and one or more receiving accounts. In some embodiments, the executable instructions further cause the processor to link the at least one funding account and the one or more receiving accounts according to the mapping strategy. In some embodiments, the executable instructions further cause the processor to set budget and transfer parameters for the linked accounts that define transfer schedules, thresholds, and reimbursement qualifications. In some embodiments, the executable instructions further cause the processor to execute a transfer of funds between the linked accounts in accordance with the budget and transfer parameters.

In some embodiments, the executable instructions further cause the processor to create one or more budget categories set a maximum amount for the one or more budget categories. In other embodiments, the executable instructions further cause the processor to identify reimbursable vendors for expenses associated with the one or more receiving accounts and reimburse the vendors up to the maximum amount. In still other embodiments, the executable instructions further cause the processor to identify a repeating account based on the account data and provide the repeating account data to the owner of the at least one funding account and receive instructions to include selected expenses from the repeating account in future reimbursement from the owner. In further embodiments, the executable instructions further cause the processor to receive an approval from an owner of the at least one funding account to link the accounts.

In additional embodiments, the executable instructions further cause the processor to create a report on the planned expenses compared to the actual expenses. In other embodiments, the executable instructions further cause the processor to create a notification for a transfer status and provide the notification to an owner of the one or more receiving accounts. In still other embodiments, the executable instructions further cause the processor to the transfer parameters comprise a time period for executing the transfer of funds. In some embodiments, the at least one funding account comprises a trust account.

Also provided are embodiments directed to computer program products for transferring funds between linked financial accounts in accordance with predefined transfer and budget criteria. The computer program products include a non-transitory computer readable storage medium having computer readable program code embodied therewith, the computer readable program code comprising computer readable program code configured to receive financial account data. In some embodiments, the computer program products further include computer readable program code configured to identify at least one funding account and one or more receiving accounts from the account data. In some embodiments, the computer program products further include computer readable program code configured to determine a mapping strategy for linking the at least one funding account and one or more receiving accounts. In some embodiments, the computer program products further include computer readable program code configured to link the at least one funding account and the one or more receiving accounts according to the mapping strategy. In some embodiments, the computer program products further include computer readable program code configured to set budget and transfer parameters for the linked accounts that define transfer schedules, thresholds, and reimbursement qualifications. In some embodiments, the computer program products further include computer readable program code configured to execute a transfer of funds between the linked accounts in accordance with the budget and transfer parameters.

In additional embodiments, the computer program products further include computer readable program code configured to create one or more budget categories and set a maximum amount for the one or more budget categories. In some embodiments, the computer program products further include computer readable program code configured to identify reimbursable vendors for expenses associated with the one or more receiving accounts and reimburse the vendors up to the maximum amount. In other embodiments, the computer program products further include computer readable program code configured to identify a repeating account based on the account data and provide the repeating account data to the owner of the at least one funding account; and receive instructions to include selected expenses from the repeating account in future reimbursement from the owner. In still other embodiments, the computer program products further include computer readable program code configured to create a report on the planned expenses compared to the actual expenses. In further embodiments, the computer program products further include computer readable program code configured to create a notification for a transfer status and provide the notification to an owner of the one or more receiving accounts.

Further provided herein are computer-implemented methods for transferring funds between linked financial accounts in accordance with predefined transfer and budget criteria. In some embodiments, the methods include receiving, by a processor, financial account data. In some embodiments, the methods include identifying, by a processor, at least one funding account and one or more receiving accounts from the account data. In some embodiments, the methods include determining, by a processor, a mapping strategy for linking the at least one funding account and one or more receiving accounts. In some embodiments, the methods include linking, by a processor, the at least one funding account and the one or more receiving accounts according to the mapping strategy. In some embodiments, the methods include setting budget and transfer parameters for the linked accounts that define transfer schedules, thresholds, and reimbursement qualifications. In some embodiments, the methods include executing, by a processor, a transfer of funds between the linked accounts in accordance with the budget and transfer parameters.

In further embodiments, the methods include creating one or more budget categories and setting a maximum amount for the one or more budget categories. In some embodiments, the methods include identifying reimbursable vendors for expenses associated with the one or more receiving accounts and reimbursing, by a processor, the vendors up to the maximum amount. In other embodiments, the methods include identifying a repeating account based on the account data; providing, by a processor, the repeating account data to the owner of the at least one funding account; and receiving instructions to include selected expenses from the repeating account in future reimbursement from the owner. In still other embodiments, the methods include receiving an approval from an owner of the at least one funding account to link the accounts.

Other aspects and features, as recited by the claims, will become apparent to those skilled in the art upon review of the following non-limited detailed description of the invention in conjunction with the accompanying figures.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein:

FIG. 4 is an illustration of a graphical user interface representing a report in accordance with various embodiments.

DETAILED DESCRIPTION

Figure 1:
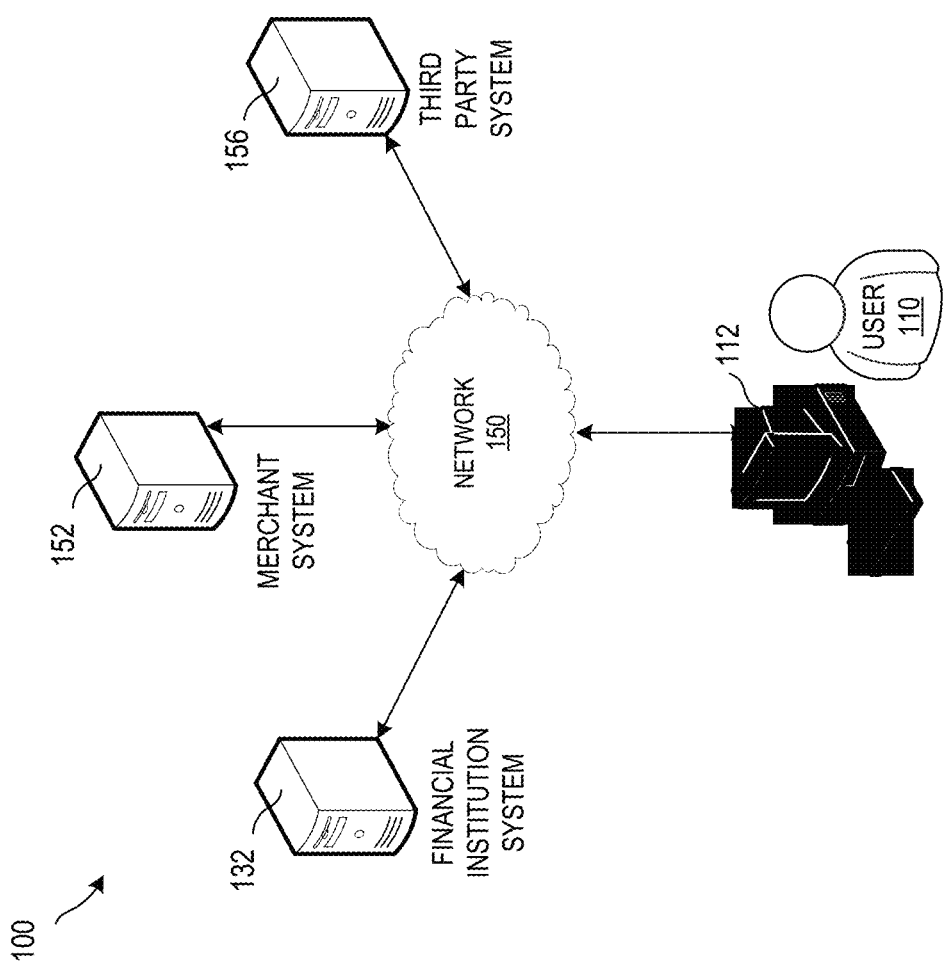
FIG. 1 provides a block diagram illustrating a system and environment for linking account and transferring funds between linked accounts in accordance with the embodiments presented herein.

The embodiments presented herein are directed to systems, methods, and computer program products for automating funding transfers between linked accounts within budget and transfer parameters. The systems and methods establish accounts to be linked and determine a mapping strategy for linking source funding accounts and receiving accounts. Account activity for the receiving account can trigger a check to determine if the certain transaction amounts are reimbursable in accordance with the various set budget and time period parameters.

The embodiments of the disclosure may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to the figures, FIG. 1 provides a block diagram illustrating a system and environment 100 for linking accounts. The system 100 includes a user 110, a device 112 of the user 110, a financial institution system 132, and a third party system 152, which are in communication with each other via a network 150. In some embodiments, the user 110 includes at least one of a customer of a financial institution, an individual or entity associated with a customer of a financial institution, an account owner of a source funding account, an account owner of a receiving account, and the like. The third party system 152 can include a system maintained by, owned, or otherwise associated with a third party financial institution, an agent of the financial institution associated with the financial institution system 132, a vendor, a payee, a payor, and so forth. In some embodiments, the user comprises multiple users. The user includes, for example, the account owner, trustee, or guardian that authorizes reimbursements to a second user who is a trust recipient, dependent, or account owner of a receiving account.

In the illustrated embodiment, the financial institution system 132 provides a secure online payment or transaction channel to the user's device 112 such as a web service. The user 110 accesses the channel on the user's device 112 to send data to and receive data from the financial institution system 132 and/or the third party system 152. Similarly, the financial institution system 132 and the third party system 152 can also use the secure transaction channel to send data to and receive data from each other or from the user's device 112. The transferred data shared among the systems and devices of FIG. 1 can include payment data, account data, transaction data or other files, notifications and communications, transactions, and the like.

Figure 2:
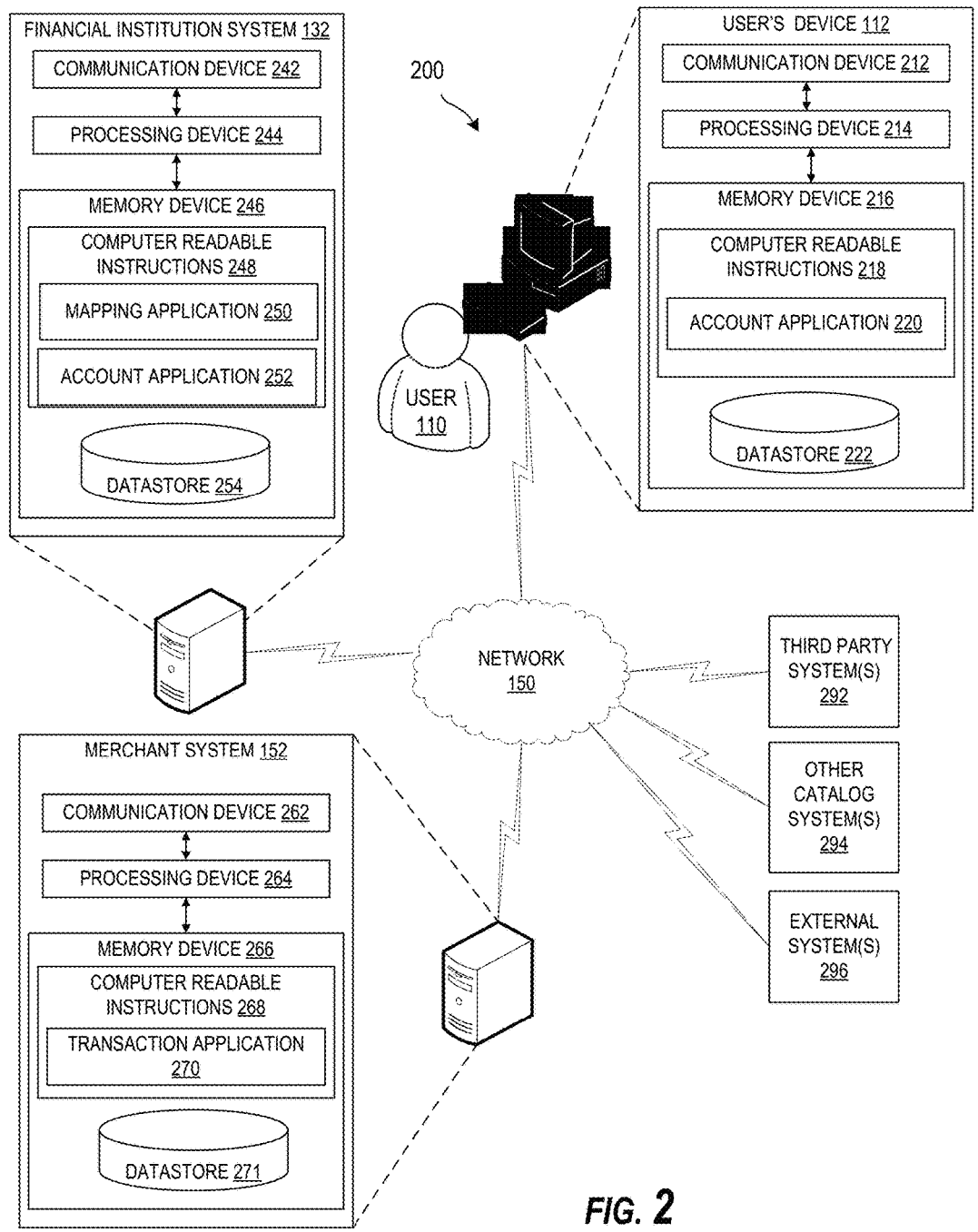
FIG. 2 provides a block diagram illustrating the financial institution system, the third party system, and the user device of FIG. 1, in accordance with various embodiments.

Referring now to FIG. 2, a block diagram illustrates an environment 200 for setting up linked account and transferring funds. The environment 200 includes the user's device 112, the third party system 152, and the financial institution system 132 of FIG. 1. The environment 200 further includes one or more other third party systems 292 (e.g., a partner, agent, or contractor associated with the financial institution system provider and/or a financial institution), one or more other financial institution systems 294 (e.g., a credit bureau, third party banks, and so forth), and one or more external systems 296. The systems and devices communicate with one another over the network 150 and perform one or more of the various steps and/or methods according to embodiments of the disclosure discussed herein. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The user's device 112, the third party system 152, and the financial institution system 132 each includes a computer system, server, multiple computer systems and/or servers or the like. The financial institution system 132, in the embodiments shown has a communication device 242 communicably coupled with a processing device 244, which is also communicably coupled with a memory device 246. The processing device 244 is configured to control the communication device 242 such that the financial institution system 132 communicates across the network 150 with one or more other systems. The processing device 244 is also configured to access the memory device 246 in order to read the computer readable instructions 248, which in some embodiments includes a mapping application 250 and an account application 252. The memory device 246 also includes a datastore 254 or database for storing pieces of data that can be accessed by the processing device 244.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The user's device 112 includes a communication device 212 and communicably coupled with a processing device 214, which is also communicably coupled with a memory device 216. The processing device 214 is configured to control the communication device 212 such that the user's device 112 communicates across the network 150 with one or more other systems. The processing device 214 is also configured to access the memory device 216 in order to read the computer readable instructions 218, which in some embodiments includes an account application 220. The memory device 216 also includes a datastore 222 or database for storing pieces of data that can be accessed by the processing device 214.

The third party system 152 includes a communication device 262 communicably coupled with a processing device 264, which is also communicably coupled with a memory device 266. The processing device 264 is configured to control the communication device 262 such that the third party system 152 communicates across the network 150 with one or more other systems. The processing device 264 is also configured to access the memory device 266 in order to read the computer readable instructions 268, which in some embodiments include a transaction application 270. The memory device 266 also includes a datastore 271 or database for storing pieces of data that can be accessed by the processing device 264.

In some embodiments, the account application 220 and the transaction application 270 interact with the mapping application 250 and account application 252 to receive or provide account data, set various transfer and budget parameters, determine mapping strategies, link accounts, track transaction in linked accounts, analyze transaction data, create reports, and process transactions.

The applications 220, 250, 252, and 270 are for instructing the processing devices 214, 244 and 264 to perform various steps of the methods discussed herein, and/or other steps and/or similar steps. In various embodiments, one or more of the applications 220, 250, 252, and 270 are included in the computer readable instructions stored in a memory device of one or more systems or devices other than the systems 152 and 132 and the user's capture device 112. For example, in some embodiments, the application 220 is stored and configured for being accessed by a processing device of one or more third party systems 292 connected to the network 150. In various embodiments, the applications 220, 250, 252, and 270 stored and executed by different systems/devices are different. In some embodiments, the applications 220, 250, 252, and 270 stored and executed by different systems may be similar and may be configured to communicate with one another, and in some embodiments, the applications 220, 250, 252, and 270 may be considered to be working together as a singular application despite being stored and executed on different systems.

In various embodiments, one of the systems discussed above, such as the financial institution system 132, is more than one system and the various components of the system are not collocated, and in various embodiments, there are multiple components performing the functions indicated herein as a single device. For example, in one embodiment, multiple processing devices perform the functions of the processing device 244 of the financial institution system 132 described herein. In various embodiments, the financial institution system 132 includes one or more of the external systems 296 and/or any other system or component used in conjunction with or to perform any of the method steps discussed herein. For example, the financial institution system 132 may include a financial institution system, an information technology system, and the like.

In various embodiments, the financial institution system 132, the third party system 152, and the user's device 112 and/or other systems may perform all or part of a one or more method steps discussed above and/or other method steps in association with the method steps discussed above. Furthermore, some or all the systems/devices discussed here, in association with other systems or without association with other systems, in association with steps being performed manually or without steps being performed manually, may perform one or more of the steps of method 300, the other methods discussed below, or other methods, processes or steps discussed herein or not discussed herein.

Figure 3:
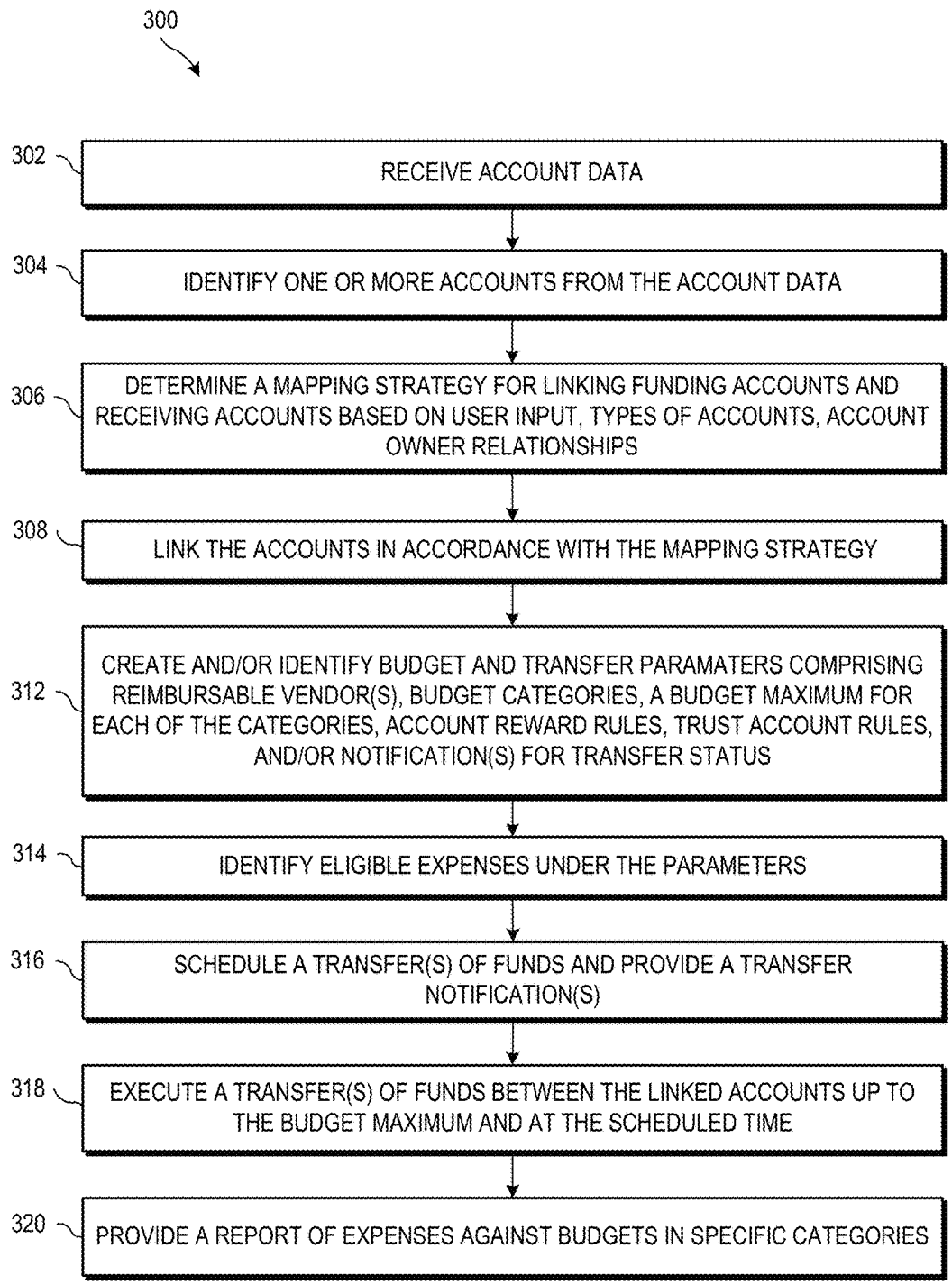
FIG. 3 is a flowchart illustrating a system and method for transferring funds between linked accounts in accordance with various embodiments.

FIG. 3 illustrates a flowchart providing an overview of a process 300 for linking accounts, setting budget/transfer parameters, and automating transfers. One or more devices, such as the one or more computing devices and/or one or more other computing devices and/or servers of FIG. 1 and FIG. 2, can be configured to perform one or more steps of the process 300 described below. In some embodiments, the one or more devices performing the steps are associated with a financial institution. In other embodiments, the one or more devices performing the steps are associated with a merchant, business, partner, third party, credit agency, account holder, and/or user.

As illustrated at block 302, account data is received. The account data can be received from a variety of sources such as third party financial institutions, merchants, and the like. In some embodiments, the account data is received from account owners. The account owners can include dependents, students, trust recipients, parents, stewards, guardians, executors, trustees, agents of the account owners, and the like. Exemplary account data includes account numbers, account balances, account activity, account terms and conditions, account statuses, financial institution data, the date accounts were opened or closed, and the like. In other embodiments, the account data is received from third parties such as an external financial institution system.

As illustrated at block 304, one or more accounts are identified from the account data. In some embodiments, the one or more accounts comprise at least one funding account and one or more receiving accounts. The funding account comprises accounts that act as a source of funding and provide funds for the receiving accounts such as checking accounts, savings accounts, trust accounts, and so forth. In some embodiments, the funding account is owned or managed by a trustee, guardian, parent, guarantor, and the like. The one or more receiving accounts includes accounts that receive funding from the at least one funding account such as a checking account of the dependent, an intermediary third party account, and the like.

In further embodiments, the one or more accounts are identified based on user input. For example, the system may prompt the user to identify a funding account or a receiving account. In other examples, the user may log onto an online or mobile banking account and sign up for a transfer program that enables them to set up and manage automatic transfers.

As illustrated at block 306, a mapping strategy for linking the at least one funding account and the one or more receiving accounts is determined. The mapping strategy may allow certain types of data transfer in one direction but not the other. For example, the user associated with the at least one funding account may receive merchant payment data for the one or more receiving accounts, but the owner of the receiving accounts may not receive the same type of data for the funding account. Also, the transfer of money may only occur in one direction such that only the receiving accounts receive funds. In other cases, the mapping strategy allows certain data to be communicated in both directions. For example, rewards, funds, refunds, or interest from the one or more receiving accounts may be transferred to the funding account in certain circumstances. If the one or more receiving accounts received a refund from a merchant, for example, the amount of the refund may be transferred to the funding account if the funding account had earlier reimbursed the receiving account for the original purchase.

In some embodiments, the mapping strategy is based on user input. For example, the system may allow the user to identify which accounts they want to link by inputting account numbers or account owner information. In other cases, the system may determine from account transaction data that the user pays a check to the owner of the receiving account every month, and prompt the user to allow or deny the linking of the accounts or make changes to the mapping strategy.

In other embodiments, the mapping strategy is determined based on types of accounts. For example, if the user is a customer of a financial institution, the system may have access to the user's account data if the user grants access permission. In such cases, the system may identify accounts for which the user is a guarantor or co-signor and tag those accounts for mapping. Further, trust accounts, savings accounts, and other types of accounts may be tagged as potential candidates for linking.

In still other embodiments, the mapping strategy is determined based on account owner relationships. For example, the system may prompt the user to input relationship data or the user may voluntarily disclose relationship data with other account owners. If the user is a trust recipient, the system may prompt the user to provide documentation or proof that the user is entitled to receive funds from a trust account, and the system may further prompt the trustee to confirm the identity of the trust recipient. Based on the account owner relationship, the mapping strategy for linking the accounts can be established.

As illustrated at block 308, the at least one funding account and the one or more receiving accounts are linked in accordance with the mapping strategy. Upon linking the accounts, the user (i.e., the account owners, agents, and the like associated with each of the linked accounts) may be allowed to view account action data for the one or more receiving accounts, or the user may receive notification about pending or issued fund transfers as described in more detail below.

In some embodiments, permission to link the accounts is received from the user. The user includes the account owner of the at least one funding account and/or the account owner of the one or more receiving accounts, the entity granted authority to grant permission to transfer funds (e.g., a parent, a guardian, an executor, and the like) or the entity receiving the funds. In some cases, the accounts are linked only in response to the user permission. In other cases, the accounts may be linked automatically.

As illustrated at block 312, budget and transfer parameters are created and/or identified. In some embodiments, the parameters include rules, restrictions, and thresholds related to reimbursable vendors, budget categories, budget maximums for each of the reimbursable vendors and/or for each of the budget categories, account rewards, trust accounts, and/or notifications for transfer status.

The reimbursable vendors can be identified based on merchant codes, the types of products the merchant provides, the transaction frequency associated with the vendor, user input, and so forth. For example, certain products such as utilities and food may be deemed a "necessity" and merchants that provide such products may be given a reimbursable status. Merchant codes may be used to identify the merchant and the products they provide. In other examples, if the accounts owner of the receiving accounts frequently makes purchases at a particular merchant, that merchant may be flagged as a potential reimbursable vendor.

The system of process 300 can further establish budget categories and subcategories. For example, a budget category can be based on a time period, a goal, an account, a vendor, a product, and the like. For example, the budget category may be a college semester and subcategories of the college semester budget could be textbooks, utility company, food, and a checking account.

The budget maximum amount for each of the budget categories or subcategories can be established based on payment data or transaction data associated with the one or more receiving accounts, balances of the funding account, and user input. For example, the system may determine that the account owner of the one or more receiving accounts spent a total of $10,000 last semester and may assign a percentage of that amount for the current or upcoming semester. If the majority of the $10,000 was spent on tuition, books, and housing, then the system may assign a budget maximum that is 100% of the previous semester's budget (i.e., $10,000). If 25% or greater of last semester's budget was spent on entertainment and travel, however, the system may assign a budget maximum amount that is less than the previous semester's budget (e.g., $7,500). Also, if an additional source of income (e.g., a grant, a scholarship reward, alimony, or income from a job) can be attributed to the one or more receiving accounts, the budget maximum may be decreased to reflect this change. In still other cases, factors such as rising tuition rates, increased housing costs, inflation, transfers, and other factors may result in an increase of the budget maximum from the previous semester. In further examples, the budget maximum amount for the time period or other budget category may remain the same, but budget maximum amounts for the subcategories may shift as the need arises.

In cases where the at least one funding account distributes funds to a plurality of different receiving accounts associated with multiple account owners, the budget maximums and other parameters for each of the plurality of the different receiving accounts in determining parameters. For example, if the multiple accounts owners of the receiving accounts are college students, the budget maximums and budget categories of one student may be compared to that of a second student to determine if parameters adjustment should be made or if new rules should be created. If the first student only spends $10,000 a semester for non-tuition expenses and the second student spends $14,000 for the same expenses during the same period of time, the system may determine the reasons for the discrepancy and adjust the semester budgets for the first student and/or second student accordingly. In some cases, the system of process 300 may provide suggested spending and savings advice to dependents or other users to help the users avoid exceeding budget maximums.

In some embodiments, the user (e.g., the account owner of the at least one funding account) accesses the one or more receiving accounts or receives data for the receiving accounts and identifies and sets the budget and transfer parameters. For example, the user may identify certain accounts and vendors they would like to reimburse, and set maximum amounts for expenses related to those accounts and vendors.

The parameters further include rules for account rewards. The rewards may be points, gift cards, cash back, discounts, free products, charitable contributions, and the like. For example, the rewards may be earned in response to using an account associated with a reward program at preselected merchants or for certain products. For some rewards, the rules can include reward distribution. For example, a dependent associated with the one or more receiving accounts may make the purchases and use accounts that result in rewards, but a guardian of the at least one funding account may receive at least a portion of the reward. In other cases, the user who earns the rewards may receive all of the rewards. In still other cases, at least a portion of the rewards may be distributed to a third party or a third account. For example, earned rewards may be automatically transferred to the user's saving accounts in some instances.

Further, the parameters also include trust related rules. For example, trusts may have certain qualification, restrictions, and other criteria that must be met before distribution of funds can occur. In some cases, the distribution may be left entirely to the discretion of the trustee. In other cases, legal restrictions may determine distribution depending on the type of trust and the terms of the trust. Some trusts may impose age restrictions for the trust recipient, transfer restrictions, qualifying expense restrictions, and so forth.

As illustrated at block 314, eligible expenses under the parameters are identified. In some embodiments, the payment data from the one or more receiving accounts is received. For example, when the user of the one or more receiving accounts makes a payment using the one or more receiving accounts, a check is triggered in the linked funding account. The system determines if the expenses for the one or more receiving accounts is eligible for reimbursement based on the budget and transfer parameters.

As illustrated at block 316, one or more transfers of funds are scheduled and one or more transfer notifications are provided. In some embodiments, the transfers are scheduled to be conducted immediately or almost immediately after the system determines that the expenses are eligible for reimbursement. For example, the reimbursement may be distributed during the next transfer cycle. In other embodiments, the transfers are scheduled for a later time. For example, reimbursements may be distributed bimonthly, once a month, and so forth. Reimbursements can be scheduled based on the frequency of payments or transactions associated with the one or more receiving accounts. For example, if a trust recipient spends or makes payments at an increased rate during the holiday season, the rate of distribution may be adjusted accordingly.

The transfer notification may be provided to both the account owner of the at least one funding account and the account owner of the one or more receiving accounts. The transfer notification can include the date the transfer is scheduled, the amount, account identifiers (e.g., the last four digits of the account number), account owners, financial institutions that maintain the linked accounts, and the like.

As illustrated at block 318, the one or more transfers of funds between the linked accounts are executed up to the budget maximum and at the scheduled time. In some embodiments, the budget maximum may be overridden such that the budget maximum amount is less than or greater than the budget maximum provided in the parameters. For example, if the expenses associated with the one or more receiving accounts exceed the budget maximum for one category and the expenses for another category is 75% less than the budget maximum for that other category, the system may automatically increase the budget maximum for the first category by a certain amount for a limited period of time. In other cases, if the expenses for a particular month exceed the budget maximum set for that month, the budget maximum for the next month may be decreased by the amount exceeded in the previous month to prevent a repeat of overspending in the future. Additionally or alternatively, a detailed analysis can be conducted to determine the cause for the overspending and projections for future spending may be adjusted accordingly.

As illustrated at block 320, a report of expenses and budgets in specific categories is provided. In some embodiments, the report is provided to the account owner of each of the linked accounts. The report may be provided in real time so that the parameters and mapping of the accounts can be adjusted according to the needs of the various account owners. For example, if the budget maximum for a food category is set at $400 per month and during the current month the expenses associated with the food category have exceeded $400, the budget maximum may be increased for the current month and decreased for a future period. Moreover, the report may provide additional information beyond the transactions and account activity of the linked accounts. For example, the report may provide data associated with repeated payments or incurred expenses for additional accounts of a dependent or trust recipient. Instead of only looking at a checking account, for example, transaction details associated with credit accounts may also be provided. The account owner of the funding account may decide to link the credit account or identify additional vendors that may be eligible for reimbursement.

FIG. 4 illustrates a graphical user interface (GUI) 400 of a report 410. The GUI 400 includes tabs for reporting, setting up accounts, budget category maintenance, and transfers. The "set up accounts" tab may be selected by the user to review account data and identify and request links between accounts. The "budget category maintenance" tab may be used to increase or decrease budget maximums, create or delete new categories, and so forth. The "transfers" tab can be used to change transfer schedules, notifications, and the like. Although the report 410 is directed to a user associated with the at least one funding account, users associated with the one or more receiving accounts may also view and make changes to the report 410 or other reports.

In the illustrated embodiment, the "reporting" tab is selected and the report 410 is displayed. In some embodiments, the report 410 is interactive. For example, all of the budget categories are listed for easy viewing. The budget categories are selected with a specific time period, which in FIG. 4 is three months. The report 410 further includes expenses for a certain period of time and for selected accounts. For example, the expenses accrued during the certain period of time may be the same as the budget maximums for each budget category (i.e., three months) for easy comparison. The user may select an account from a drop down menu for comparing to one or more budget categories and budget maximums. In FIG. 4, a living budget category is selected and compared to account expenses for the selected account. For example the account selected may be a credit card account that lists a description of the transaction, the merchant, and description of product purchased and the amount of the transaction. Depending on the budget category selected, some of the transactions may be tagged or greyed out to indicate the transactions that may or may not be applied to the budget maximum for the selected budget category. The budget categories and associated budget maximums may also be edited. For example, the budget maximum amount may be set for the food category by clicking on link indicated in the GUI 400. The link may take the user to, for example, the "set up accounts" tab or the "budget category maintenance" tab. Moreover, a budget category itself may be edited to include different or additional qualifications of expenses for the "work budget" category as shown in FIG. 4. For example, if a trustee recipient or dependent changes a job status (e.g., loses a job or changes jobs), the qualifying expenses under the category may also change.

The flowcharts and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or teams thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement, which is calculated to achieve the same purpose, may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for transferring funds between linked financial accounts in accordance with predefined transfer and budget criteria, the system comprising:
   a computer apparatus including a processor and a memory; and
   a software module stored in the memory, comprising executable instructions that when executed by the processor cause the processor to:
      receive financial account data associated with a user;
      identify at least one funding account and one or more receiving accounts from the account data;
      determine a mapping strategy for linking the at least one funding account and one or more receiving accounts, wherein the mapping strategy is defined automatically by providing link suggestions based on account types or account owner relationships;
      link the at least one funding account and the one or more receiving accounts according to the mapping strategy;
      configure the mapping strategy to authorize a transfer of funds between the at least one funding account and the one or more receiving accounts to occur in both directions;
      set budget and transfer parameters for the linked accounts that define transfer schedules, thresholds, and reimbursement qualifications, wherein the thresholds comprise one or more budget categories, each budget category having predetermined maximum amounts that will not be exceeded within a predetermined time period without approval by the user;
      receive a request for a transfer of funds between the linked accounts in accordance with the budget and transfer parameters, wherein the request for the transfer of funds is associated with a first budget category of the one or more budget categories and a first predetermined maximum amount associated with the first budget category;
      determine that the request for the transfer of funds exceeds the predetermined maximum amount for the first budget category;
      generate a budget report in real time, in response to determining that the request for the transfer of funds exceeds the predetermined maximum amount for the first budget category, wherein the budget report includes a notification of exceeding the predetermined maximum amount for the first budget category;
      in response to generating the budget report, automatically transmit control signals configured to cause a wireless device of the user to (i) display the budget report and (ii) request user input for an adjusted maximum amount for the first budget category;
      receive, from the wireless device of the user, the user input of the adjusted maximum amount for the first budget category;
      in response to receiving the user input of the adjusted maximum amount for the first budget category, execute the transfer of funds between the linked accounts in accordance with the budget and transfer parameters;

in response to executing the transfer of funds between the linked accounts, automatically generate a transfer notification comprising a confirmation of the transfer of funds, the adjusted maximum amount for the first budget category; and in response to generating the transfer notification, transmit, automatically, control signals configured to cause the wireless device associated with the user to display the transfer notification.

2. The system of claim 1, wherein the executable instructions further cause the processor to:

identify reimbursable vendors for expenses associated with the one or more receiving accounts;

reimburse the reimbursable vendors up to the predetermined maximum amounts that will not be exceeded without approval by the user.

3. The system of claim 1, wherein the executable instructions further cause the processor to:

identify a repeating account based on the account data;

provide the repeating account to the owner of the at least one funding account;

receive instructions to include selected expenses from the repeating account in future reimbursement from the owner.

4. The system of claim 1, wherein the executable instructions further cause the processor to:

receive an approval from the user to link the at least one funding account and the one or more receiving accounts, wherein the user is an owner of the at least one funding account.

5. The system of claim 1, wherein the executable instructions further cause the processor to:

create a report on planned expenses compared to actual expenses.

6. The system of claim 1, wherein the at least one funding account comprises a trust account.

7. A computer program product for transferring funds between linked financial accounts in accordance with predefined transfer and budget criteria, the computer program product comprising:

a non-transitory computer readable storage medium having computer readable program code embodied therewith, the computer readable program code comprising:

computer readable program code configured to receive financial account data associated with a user;

computer readable program code configured to identify at least one funding account and one or more receiving accounts from the account data;

computer readable program code configured to determine a mapping strategy for linking the at least one funding account and one or more receiving accounts, wherein the mapping strategy is defined automatically by providing link suggestions based on account types or account owner relationships;

computer program code configured to configure the mapping strategy to authorize a transfer of funds between the at least one funding account and the one or more receiving accounts to occur in both directions;

computer readable program code configured to link the at least one funding account and the one or more receiving accounts according to the mapping strategy;

computer readable program code configured to set budget and transfer parameters for the linked accounts that define transfer schedules, thresholds, and reimbursement qualifications, wherein the thresholds comprise one or more budget categories, each budget category having predetermined maximum amounts that will not be exceeded within a predetermined time period without approval by the user;

computer readable program code configured to receive a request for a transfer of funds between the linked accounts in accordance with the budget and transfer parameters, wherein the request for the transfer of funds is associated with a first budget category of the one or more budget categories and a first predetermined maximum amount associated with the first budget category;

computer readable program code configured to determine that the request for the transfer of funds exceeds the predetermined maximum amount for the first budget category;

computer readable program code configured to generate a budget report in real time, in response to determining that the request for the transfer of funds exceeds the predetermined maximum amount for the first budget category, wherein the budget report includes a notification of exceeding the predetermined maximum amount for the first budget category;

computer readable program code configured to, in response to generating the budget report, automatically transmit control signals configured to cause a wireless device of the user to (i) display the budget report and (ii) request user input for an adjusted maximum amount for the first budget category;

computer readable program code configured to receive, from the wireless device of the user, the user input of the adjusted maximum amount for the first budget category;

computer readable program code configured to, in response to receiving the user input of the adjusted maximum amount for the first budget category, execute the transfer of funds between the linked accounts in accordance with the budget and transfer parameters;

computer readable program code configured to, in response to executing the transfer of funds between the linked accounts, automatically generate a transfer notification comprising a confirmation of the transfer of funds, the adjusted maximum amount for the first budget category; and computer readable program code configured to, in response to generating the transfer notification, transmit, automatically, control signals configured to cause the wireless device associated with the user to display the transfer notification.

8. The computer program product of claim 7, further comprising computer readable program code configured to identify reimbursable vendors for expenses associated with the one or more receiving accounts and reimburse the reimbursable vendors up to the maximum amounts that will not be exceeded without approval by the user.

9. The computer program product of claim 7, further comprising computer readable program code configured to identify a repeating account based on the account data; provide the repeating account to the owner of the at least one funding account; and receive instructions to include selected expenses from the repeating account in future reimbursement from the owner.

10. The computer program product of claim 7, further comprising computer readable program code configured to create a report on planned expenses compared to actual expenses.

11. A computer-implemented method for automated transfer for linked accounts, the method comprising:

receiving, by a processor, financial account data associated with a user;

identifying, by a processor, at least one funding account and one or more receiving accounts from the account data;

determining, by a processor, a mapping strategy for linking the at least one funding account and one or more receiving accounts, wherein the mapping strategy is defined automatically by providing link suggestions based on account types or account owner relationships;

linking, by a processor, the at least one funding account and the one or more receiving accounts according to the mapping strategy;

configuring, by a processor, the mapping strategy to authorize a transfer of funds between the at least one funding account and the one or more receiving accounts to occur in both directions;

setting budget and transfer parameters for the linked accounts that define transfer schedules, thresholds, and reimbursement qualifications, wherein the thresholds comprise one or more budget categories, each budget category having predetermined maximum amounts that will not be exceeded within a predetermined time period without approval by the user;

receiving a request for a transfer of funds between the linked accounts in accordance with the budget and transfer parameters, wherein the request for the transfer of funds is associated with a first budget category of the one or more budget categories and a first predetermined maximum amount associated with the first budget category;

determining that the request for the transfer of funds exceeds the predetermined maximum amount for the first budget category;

generating a budget report in real time, in response to determining that the request for the transfer of funds exceeds the predetermined maximum amount for the first budget category, wherein the budget report includes a notification of exceeding the predetermined maximum amount for the first budget category;

in response to generating the budget report, automatically transmitting control signals configured to cause a wireless device of the user to (i) display the budget report and (ii) request user input for an adjusted maximum amount for the first budget category;

receive, from the wireless device of the user, the user input of the adjusted maximum amount for the first budget category;

in response to receiving the user input of the adjusted maximum amount for the first budget category, executing, by a processor, the transfer of funds between the linked accounts in accordance with the budget and transfer parameters;

in response to executing the transfer of funds between the linked accounts, automatically generating a transfer notification comprising a confirmation of the transfer of funds, the adjusted maximum amount for the first budget category; and in response to generating the transfer notification, transmitting, automatically by a processor, control signals configured to cause the wireless device associated with the user to display the transfer notification.

12. The computer-implemented method of claim 11, further comprising:

identifying reimbursable vendors for expenses associated with the one or more receiving accounts;

reimbursing, by a processor, the reimbursable vendors up to the predetermined maximum amounts that will not be exceeded without approval by the user.

13. The computer-implemented method of claim 11, further comprising:

identifying a repeating account based on the account data;

providing, by a processor, the repeating account to the owner of the at least one funding account;

receiving instructions to include selected expenses from the repeating account in future reimbursement from the owner.

14. The computer-implemented method of claim 11, further comprising:

receiving an approval from the user to link the at least one funding account and the one or more receiving accounts, wherein the user is an owner of the at least one funding account.

* * * * *